United States Patent
Chan et al.

(10) Patent No.: US 7,389,518 B2
(45) Date of Patent: Jun. 17, 2008

(54) CHANGER WITH COMPACT LOADING MECHANISM

(75) Inventors: Yat Fung Chan, Kingswood Villa (HK); Kwok Wai Cheng, Kowloon (HK); Wei Cui, Singapore (SG); Eng Choon Low, Singapore (SG); Tony Ho, Kowloon Bay (HK)

(73) Assignee: Thomson Licensing, Boulogne Billancourt (FR)

( * ) Notice: Subject to any disclaimer, the term of this patent is extended or adjusted under 35 U.S.C. 154(b) by 404 days.

(21) Appl. No.: 10/742,526

(22) Filed: Dec. 19, 2003

(65) Prior Publication Data
US 2004/0168176 A1   Aug. 26, 2004

(30) Foreign Application Priority Data
Jan. 6, 2003   (EP)   .................................. 03290024

(51) Int. Cl.
*G11B 17/04* (2006.01)
(52) U.S. Cl. ....................................................... 720/601
(58) Field of Classification Search ............. 369/30.85, 369/30.87, 30.7, 30.72, 30.51, 30.52, 30.43, 369/75.2; 720/610, 676, 601; 360/92
See application file for complete search history.

(56) References Cited

U.S. PATENT DOCUMENTS

| | | | |
|---|---|---|---|
| 5,146,375 A * | 9/1992 | Satoh et al. .................. 360/92 |
| 5,784,350 A * | 7/1998 | Akiba et al. ................. 720/606 |
| 5,854,782 A * | 12/1998 | Tamiya et al. .............. 720/676 |
| 6,454,509 B1 | 9/2002 | Kappel et al. .............. 414/280 |
| 6,826,764 B2 * | 11/2004 | Fujisawa ..................... 720/610 |
| 2002/0085458 A1 * | 7/2002 | Luffel et al. ............. 369/30.43 |
| 2002/0191500 A1 | 12/2002 | Sato et al. .................. 369/30.7 |
| 2003/0063549 A1 * | 4/2003 | Kato et al. .................. 369/75.2 |

FOREIGN PATENT DOCUMENTS

EP   0871168 A2   10/1998

\* cited by examiner

*Primary Examiner*—Tianjie Chen
(74) *Attorney, Agent, or Firm*—Joseph J. Laks; Harvey D. Fried; Patricia Verlangieri

(57) ABSTRACT

According to the invention, a changer with a tray loading mechanism, wherein a tray holding a recording medium is transported from a storage position to a playback position and vice versa with a transport hook, which engages a recess of the tray, has a transport hook which is provided with a torsion spring for rotating the transport hook from a tray grabbing position into a tray transport position, wherein the transport hook can be rotated into the tray grabbing position in mid-travel.

9 Claims, 5 Drawing Sheets

CHANGER WITH COMPACT LOADING MECHANISM

FIELD OF THE INVENTION

The present invention relates to an elevator type changer for optical recording media with a tray loading mechanism, the changer comprising a number of trays arranged one above the other, each tray capable of holding an optical recording medium.

BACKGROUND OF THE INVENTION

Changers for optical recording media like CD, DVD, or the like generally consist of a main chassis including the drive elements and the electrical modules for processing the signals for the recording and/or playback operation. Within the chassis a number of trays is arranged one above the other, each tray being capable of holding an optical recording medium. For the playback and/or recording operation, the trays can be moved from a storage position to a playback position. For this purpose, the respective tray holding the recording medium which is to be played back or recorded, is usually grabbed by two hooks engaging with corresponding recesses of the tray, one hook at each side of the tray. Since the hooks have to catch and to release the trays in the storage position, a rotation mechanism is provided for rotating the hooks from their tray transport position to the tray grabbing position. Such a rotation mechanism can, for example, be realised using hooks provided with two studs and cam grooves having a bent part at one end. When the hooks are moved along the cam grooves they are forced into rotation as soon as the first studs arrive at the bent parts of the cam grooves (cf. FIG. 1).

For very compact changers, due to space requirements very often only a single hook is used for tray transport. In this case, however, it can occur that the hook accidentally releases the tray due to vibrations or a canting of the tray. If this happens, the tray has to be moved back into the storage position before it can be grabbed again.

The document JP 08-161813 discloses a changer using a single transport hook, wherein the rotation mechanism is realised using a coil spring and a salient pin. When the hook is moved to the storage position of the tray, part of the hook abuts the salient pin and the hook is rotated into a tray grabbing position. At the same time, the coil spring is strained, forcing the hook back into the tray transport position when the hook is retracted from the storage position of the tray. To prevent that the hook accidentally releases the tray during transport, the hook is provided with a pin contacting a guide shaft during tray transport. This contacting limits any rotation of the hook during tray transport to such an amount that the tray is not released under normal conditions. However, in case of strong vibrations or a canting of the tray, it can still occur that the tray is released during transport. In this case it has to be brought back into the storage position before it can be grabbed again.

It is an object of the invention to improve a known changer with a tray loading mechanism.

SUMMARY OF THE INVENTION

According to the invention, a changer with a tray loading mechanism, wherein a tray holding a recording medium is transported from a storage position to a playback position and vice versa with a transport hook, which engages a recess of the tray, has a transport hook which is provided with a torsion spring for rotating the transport hook from a tray grabbing position into a tray transport position, wherein the transport hook can be rotated into the tray grabbing position in mid-travel. Using a torsion spring has the advantage that the spring and the transport hook can be easily assembled. At the same time a torsion spring is strong enough to keep the transport hook in the tray transport position during transport of a tray. By allowing the hook to rotate into the tray grabbing position in mid-travel, i.e. during transport of the tray from the storage position to the playback position and vice versa, it is possible to re-engage the tray by simply pushing the hook against the tray in case the hook accidentally disengages the tray. There is no need to move the tray back to the storage position before it can be re-engaged. Advantageously, a tip of the hook, which engages the tray, is inclined towards an axis of rotation of the hook.

Favourably, a rib is provided for rotating the hook into the tray grabbing position at the storage position of the tray. The rib can be manufactured as an integral part of the elevator of the changer or of another part of the changer having a fixed position relative to the playback position. By using a rib no further mechanical parts have to be provided for rotating the hook from the tray transport position into the tray grabbing position. This arrangement is, therefore, very reliable and inexpensive. Advantageously, the hook is provided with an extending part serving as a lever for the rotation.

According to another aspect of the invention a locking means is provided for locking the tray in the playback position. For playback or recording of a recording medium it is desirable to keep the tray in a fixed position to prevent any interference with the playback or recording operation. This is reliably achieved by locking the tray in the playback position with a locking means. The locking means can be, for example, a pin which is inserted into an opening of the tray, or a stopper placed in front of the tray which prevents movement of the tray in direction of the storage position.

Advantageously, an alignment means is provided for aligning the tray in the playback position. Since the tray is transported from the storage position to the playback position using only a single transport hook on one side of the tray, there is a risk that on the opposite side of the tray the tray is not completely moved to the playback position, i.e. that the tray is slightly canted. The alignment means corrects the position of the tray by pulling or pushing the tray to the exact playback position. Since the position of the tray has to be well-defined when a recording medium held in the tray is to be placed on a disk table for playback or recording, a better reliability is achieved in this way. The alignment means is realized, for example, as a hook cooperating with an opening of the tray, or as a pusher pushing the tray in direction of the storage position.

Favourably the locking means and the alignment means are combined in a single element. This allows to perform aligning and locking of the tray in a single step. Furthermore, production cost is reduced since only a single element has to be manufactured, which can be installed in the changer in one step. The combined alignment and locking means is realized, for example, as a hook having a pointed tip, which is rotated and inserted into an opening of the tray. The pointed tip ensures that the hook can be inserted in the opening even if the opening is not exactly aligned to the hook. By rotating the hook the tray is pulled in the direction of the playback position.

Advantageously, stoppers are provided for defining the playback position of the tray. Providing stoppers is an easy and efficient way to achieve a well-defined playback position. When the tray is pulled in the direction of the playback position by the alignment means or the combined alignment and locking means, the tray is pressed against the stoppers. The position of the stoppers then defines the final position of the tray.

Favourably, the locking means, the alignment means, and/or the combined locking and alignment means are actuated by a bracket used for playback of a recording medium. In this way no dedicate drive mechanism is needed for aligning and/or locking the tray. Elevator type disk changers comprise a pivotable bracket supporting, inter alia, a disk table and a pickup. For playback or recording the pivotable bracket is pivoted upward into an essentially horizontal position and lifts the recording medium held in the tray with the disk table. This pivoting movement of the bracket is advantageously used for actuating the locking means, the alignment means, and/or the combined locking and alignment means.

Advantageously, an apparatus for reading from and/or writing to optical recording media comprises a changer with a tray loading mechanism according to the invention for transporting a tray from a storage position to a playback position.

BRIEF DESCRIPTION OF THE DRAWINGS

Exemplary embodiments of the invention are specified in the following description of advantageous configurations with reference to the figures. It is understood that the invention is not limited to these exemplary embodiments and that the specified features can also expediently be combined and/or modified without departing from the scope of the present invention. In the figures.

DETAILED DESCRIPTION OF PREFERED EMBODIMENTS

Figure 1:
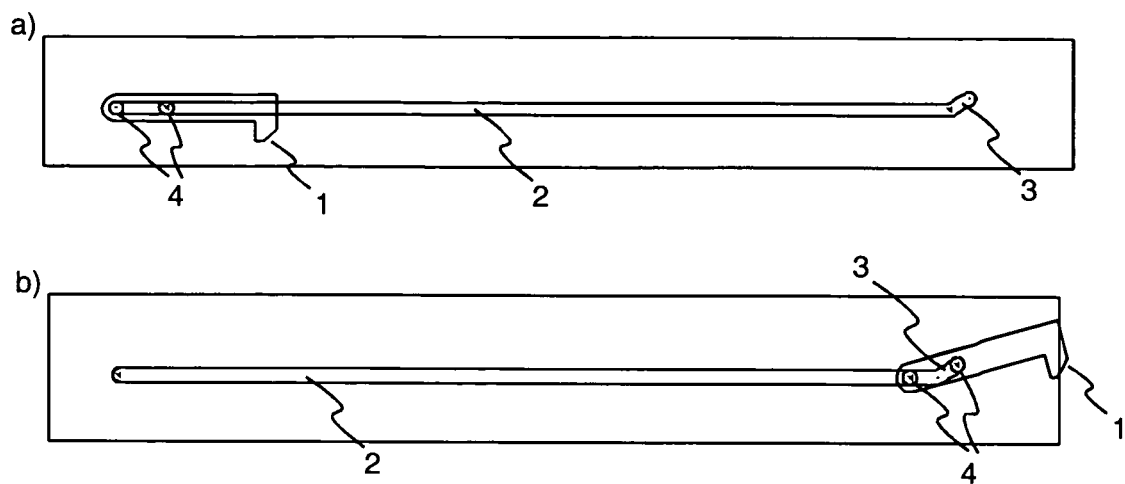
FIG. 1 shows a tray loading mechanism according to prior art.

FIGS. 1a) and 1b) show a tray loading mechanism comprising a transport hook 1 according to prior art. The hook 1 has two studs 4, which are guided by a cam groove 2. The cam groove 2 has a bent part 3 at its one end. The hook 1 can be moved from a tray playback position, which is shown in FIG. 1a), to a tray storage position, which is shown in FIG. 1b), and vice versa. When upon movement from the playback position to the storage position the first of the two studs 4 arrives at the bent part 3 of the cam groove 2, the hook 1 starts to rotate from a tray transport position to a tray grabbing position. In this way the hook 1 can engage a tray 5 (not shown in FIG. 1) for transport to the playback position or disengage the tray 5 after transport to the storage position.

There is, however, a risk that during transport of the tray 5 the hook 1 accidentally disengages the tray, e.g. due to canting of the tray or strong vibrations of the chassis. This is especially the case if only a single hook 1 at one side of the tray 5 is used for tray transport, e.g. due to space requirements. If the hook 1 accidentally disengages the tray 5, the tray 5 has first to be brought back to the storage position before the hook 1 can engage the tray 5 again. There is no possibility to re-engage the tray 5 in mid travel, i.e. without moving it back to the storage position.

Figure 2:
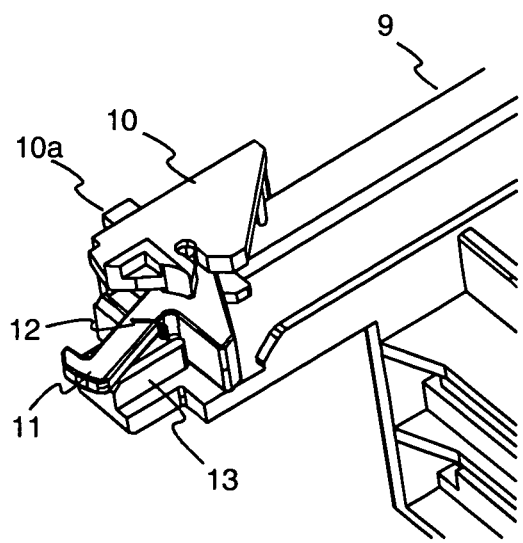
FIG. 2 shows a tray loading mechanism according to the invention.

In FIG. 2 a tray loading mechanism 10 according to the invention is shown. In this exemplary embodiment the tray loading mechanism 10 is attached to the elevator 9 of an elevator type changer for optical recording media. Of course, the tray loading mechanism 10 according to the invention is also applicable to other types of changers. The tray loading mechanism 10 comprises a transport hook 11, which is provided with a torsion spring 12. In the figure, the tray loading mechanism 10 is in the storage position. In this position the hook 11 is pushed against a rib 13, which forms part of the elevator. By pushing the hook 11 against this rib 13, the hook 11 is rotated from a tray transport position to a tray grabbing position, which allows to engage the tray 5 (not shown in FIG. 2) for transport to the playback position or to disengage the tray 5 after transport to the storage position, and the torsion spring 12 is strained. The tray transport mechanism 10 is provided with a pin 10a. The pin 10a is guided by a guide rail (not shown), which is also used for guiding a guiding element 8 of the tray shown in FIG. 4. In the guide rail a tray locking pin 10b (shown in FIG. 5) is provided, which can be moved from an extracted position, in which the tray 5 is secured, to a retracted position, in which the tray 5 is released. For disengaging the tray 5, further to rotating the hook 11 by pushing it against the rib 13, the tray locking pin is moved into the extracted position, thus securing the tray, and pushes against the pin 10a. In this way the tray loading mechanism 10 and consequently the hook 11 is further rotated and releases the tray 5. When the tray loading mechanism 10 is retracted from the storage position, the torsion spring 12 forces the hook 11 to rotate back into the tray transport position. Contrary to the tray loading mechanism known from prior art, the hook 11 can be rotated into the tray grabbing position anywhere along its way from the storage position to the playback position. Therefore, in case the hook 11 accidentally disengages the tray 5 during transport from the storage position to the playback position, it is sufficient to move the tray loading mechanism 10 back in the direction of the tray. In this way the hook 11 is pushed against the tray 5 and forced to rotate into the tray grabbing position. Due to the torsion spring 12 it will then snap into the tray transport position, i.e. it will engage the tray 5 again. The tray 5 does not have to be brought back to the storage position before it can be engaged by the hook 11 again.

Figure 3:
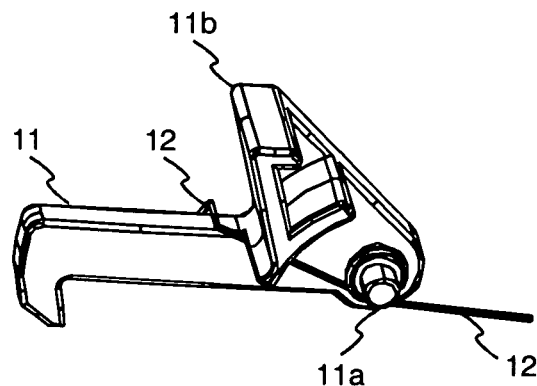
FIG. 3 shows a transport hook used by the tray loading mechanism in more detail.

The hook 11 used by the tray loading mechanism 10 is shown in FIG. 3 in more detail. As can be seen from the figure, the torsion spring 12 provided for forcing the hook 11 into the tray transport position is secured by a pin 11a serving at the same time as a hinge for the hook 11. This arrangement allows a very efficient assembly of the hook 11 and the torsion spring 12. The hook further has an extending part 11b serving as a lever for the rotation of the hook 11 when it is pushed against the rib 13. In FIG. 3 another advantage of the hook 11 is also shown. As can be seen, the angled tip of the hook 11, which engages the tray 5, is not arranged at a right angle relative to the main arm of the hook 11. Instead, it is inclined towards the pin 11a. This ensures that the tip engages the try 5 very securely when the tray 5 is pulled. Favourably, the angled tip has an inclination of about 15° towards the pin 11*a*.

Figure 4:
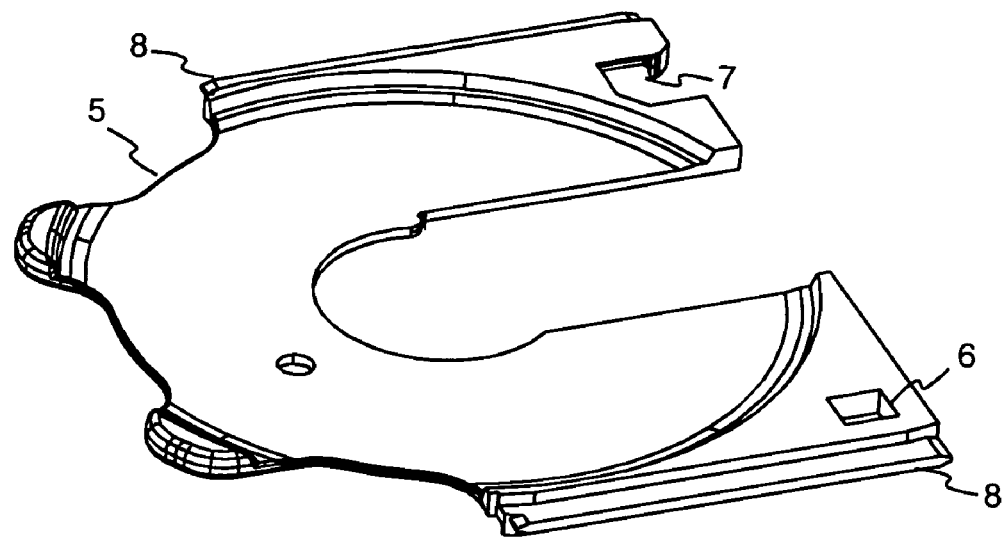
FIG. 4 shows a tray for use with the tray loading mechanism.

FIG. 4 shows the tray 5 for use with the tray loading mechanism 10 according to the invention. The tray 5 has a recess 7 used for the transport the tray 5 from the storage position to the playback position and vice versa. For transport, the hook 11 engages this recess 7. In addition, the tray 5 has an opening 6, which is used for securing and aligning the tray 5 in the playback position. For guiding the tray 5 from the storage position to the playback position during transport, the tray 5 further has two guiding elements 8 working together with a pair of guide rails (not shown).

Figure 5:
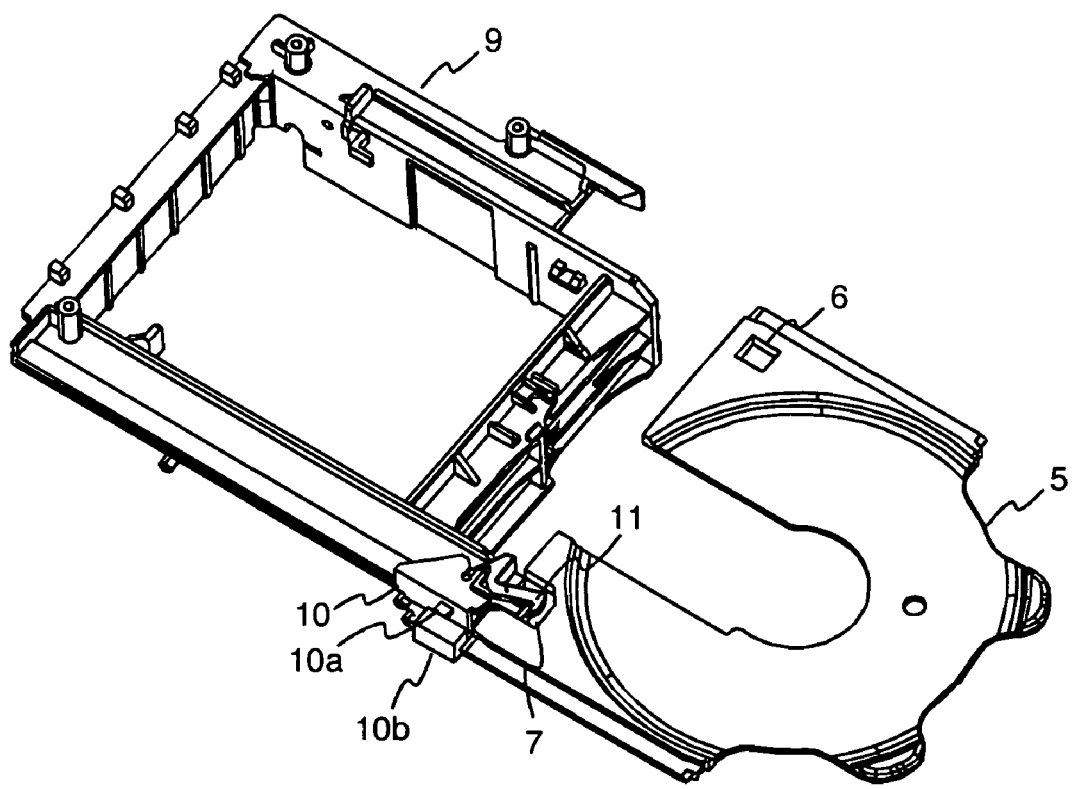
FIG. 5 shows the tray before transport to a playback position.
Figure 6:
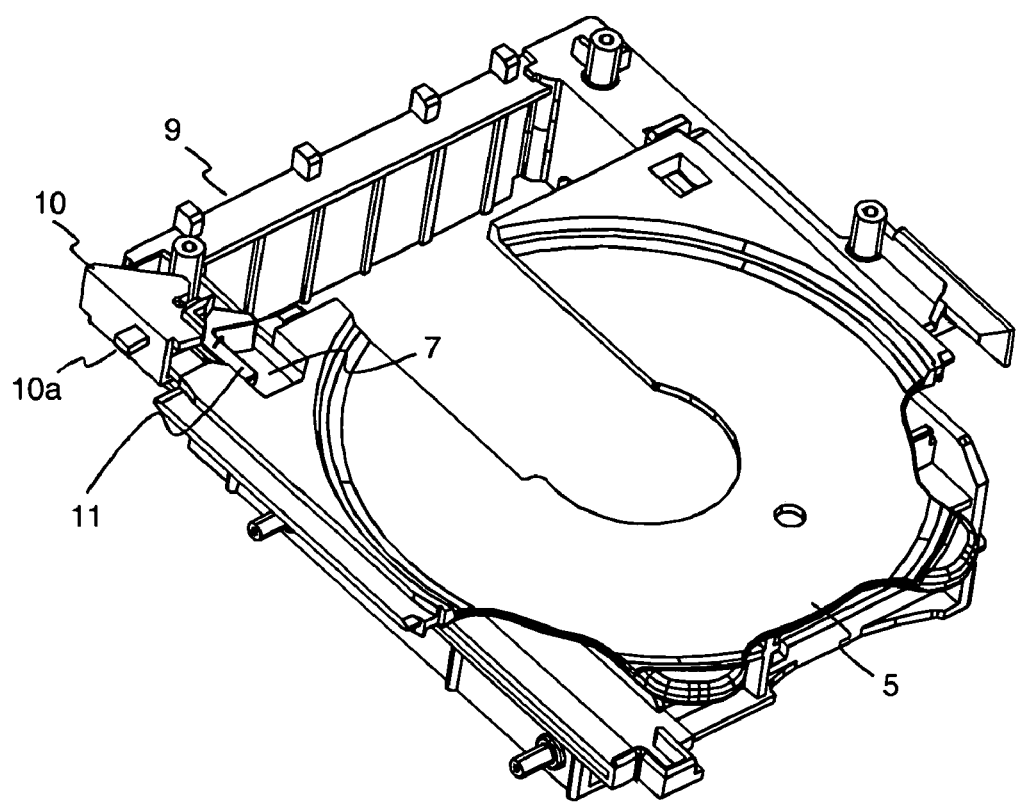
FIG. 6 shows the tray after transport to the playback position.

FIG. 5 shows the tray 5 before transport to the playback position on the elevator 9. The tray loading mechanism 10 has been moved to the storage position. The extending part 11*b* of the hook 11 has been pushed against the rib 13 of the elevator 9 and the hook 11 has been rotated into the tray grabbing position accordingly. When the tray loading mechanism 10 is retracted, the torsion spring 12 forces the hook 11 back into the tray transport position. The hook 11 will, therefore, engage with the recess 7 of the tray 5. The tray 5 is then transported from the storage position to the playback position, as shown in FIG. 6. Upon transport it is guided by the guiding elements 8. In case the hook 11 accidentally disengages the tray 5 during transport, e.g. due to vibrations or canting of the tray 5, the tray loading mechanism 10 and correspondingly the hook 11 will be pushed against the tray 5 and the hook 11 can snap in in the recess 7 again. In this way it is not necessary to move the tray 5 back to the storage position to re-engage the hook 11. Also shown in the figure is the tray locking pin 10*b*, which on the one hand secures the tray 5 in the storage position and on the other hand serves for disengaging the hook 11 from the tray 5. For this purpose it pushes against the pin 10*a* of the tray transport mechanism 10, thus rotating the hook 11 further until it releases the tray 5.

Figure 7:
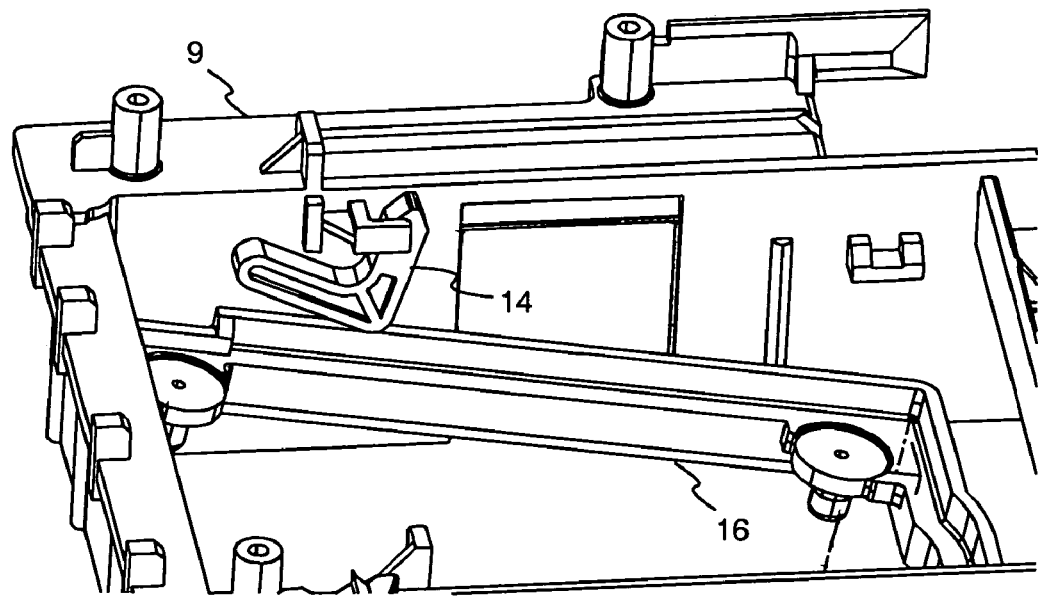
FIG. 7 shows an alignment lock for locking and aligning the tray in the playback position.
Figure 8:
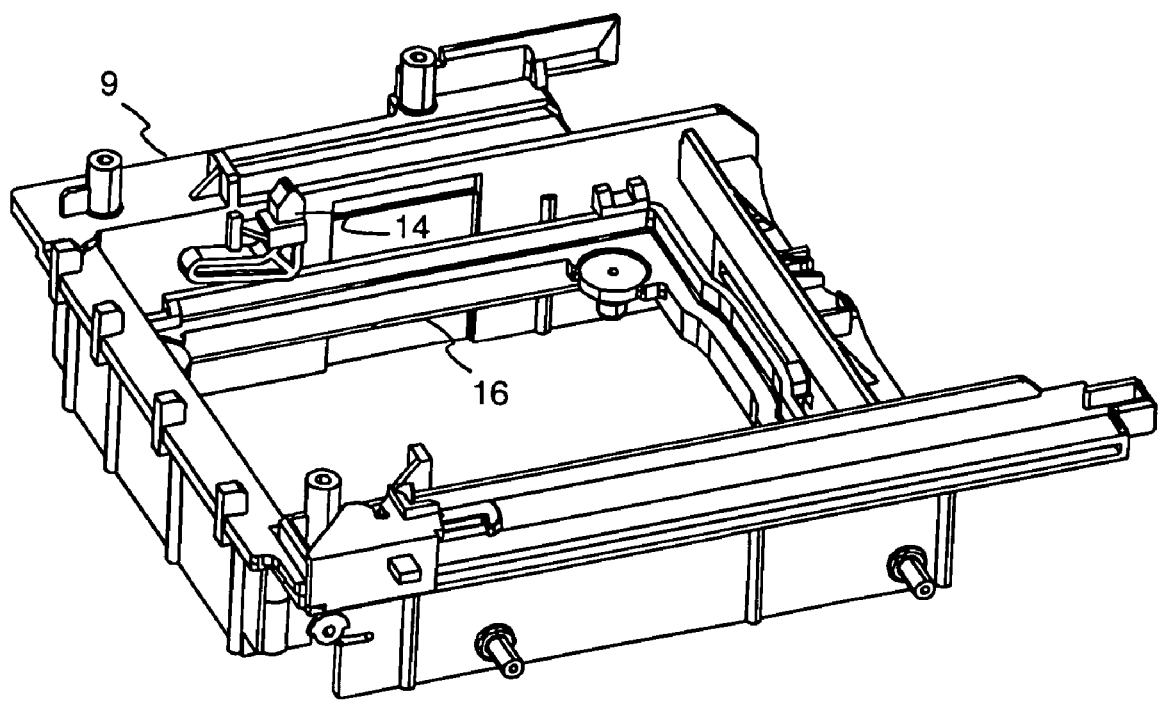
FIG. 8 shows the alignment lock in its locking position.

In FIG. 7 an alignment lock 14 for aligning and locking the tray 5 in the playback position is shown. The alignment lock 14 is actuated by a bracket 16. The bracket 16 supports the elements needed for playback and/or recording of the optical recording media, e.g. a disk table and a pickup (not shown). When the bracket 16 is brought into the playback position, it moves upward and pushes the alignment lock 14 into a locking position, as can be seen in FIG. 8. When the bracket 16 is moved out of the playback position again, the alignment lock 14 automatically falls back into a releasing position.

Figure 9:
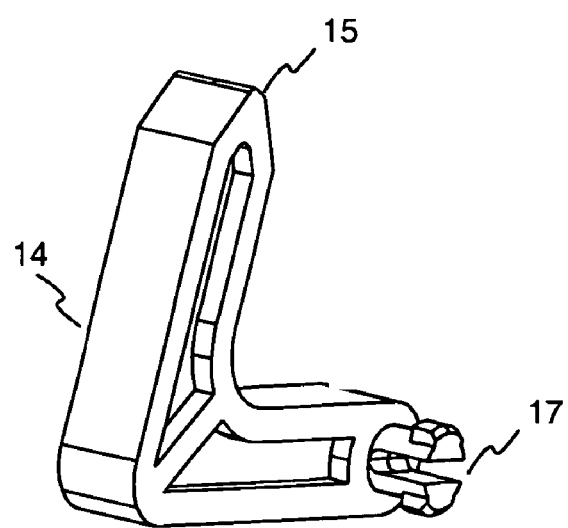
FIG. 9 shows the alignment lock in more detail.

FIG. 9 shows the alignment lock 14 in more detail. The alignment lock 14 comprises two snap-on hooks 17 for attaching it to the elevator 9. For aligning and locking a tray 5 the alignment lock 14 comprises an essentially triangular tip 15, which is inserted in the opening 6 of the tray 5. It is of course also possible to use other types of tips 15 for the alignment lock 14, e.g. a conical tip.

Figure 10:
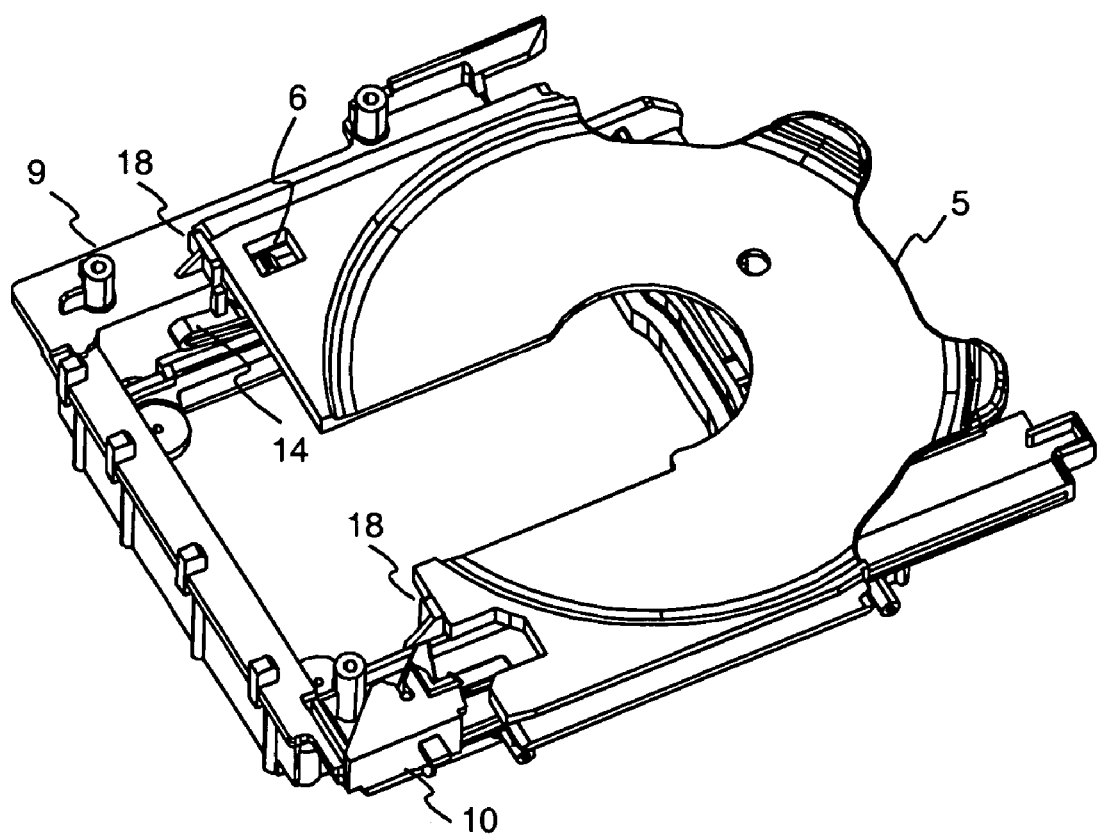
FIG. 10 shows the alignment lock engaging the tray in the playback position.

In FIG. 10 the tray 5 locked in the playback position is shown. For playback, the tray 5 is transported from the storage position to the playback position by the tray loading mechanism 10. Since in this embodiment the tray 5 is only pulled at one side by a single hook 11, it can occur that after transport the tray 5 is slightly canted, i.e. that on the opposite side of the tray loading mechanism 10 the tray 5 has not completely arrived at the playback position. Therefore, when the bracket is moved upward into the playback position, it pushes the alignment lock 14 upwards. The tip 15 of the alignment lock 14 is inserted into the opening 6 of the tray 5 and pulls the tray 5 against a pair of stoppers 18, which form part of the elevator 9. In this way the tray 5 is brought into a well-defined playback position. After alignment, the alignment lock 14 secures the tray 5 in the playback position.

What is claimed is:

1. Changer for optical recording media with a tray loading mechanism, wherein a tray holding a recording medium is transported from a storage position to a playback position and vice versa with a transport hook, which engages a recess of the tray by rotating the transport hook from a tray grabbing position into a tray transport position, the transport hook being able to rotate into the grabbing position at any point along its way from the storage position to the playback position, wherein a relative angle between a tray-contacting face of an angled tip of the hook, which engages the tray, and a main arm of the hook is smaller then 90°.

2. Changer for optical recording media with a tray loading mechanism according to claim 1, wherein the hook is provided with a torsion spring for rotating the transport hook from the tray grabbing position into the tray transport position.

3. Changer for optical recording media with a tray loading mechanism according to claim 1, wherein a rib is provided for rotating the transport hook into the tray grabbing position at the storage position of the tray.

4. Changer for optical recording media with a tray loading mechanism according to claim 1, wherein a locking means is provided for locking the tray in the playback position.

5. Changer for optical recording media with a tray loading mechanism according to claim 4, wherein an alignment means is provided for aligning the tray in the playback position.

6. Changer for optical recording media with a tray loading mechanism according to claim 5, wherein the locking means and the alignment means are combined in a single element.

7. Changer for optical recording media with a tray loading mechanism according to claim 6, wherein the looking means, the alignment means, and/or the combined locking and alignment means are actuated by a bracket used for playback of a recording medium.

8. Changer for optical recording media with a tray loading mechanism according to claim 1, wherein stoppers are provided for defining the playback position of the tray.

9. Apparatus for reading from and/or writing to optical recording media, wherein a changer with a tray loading mechanism according to claim 1 is provided for transporting a tray from a storage position to a playback position.

* * * * *